US009010775B1

(12) United States Patent
Palmer

(10) Patent No.: US 9,010,775 B1
(45) Date of Patent: Apr. 21, 2015

(54) APPARATUS FOR STABILIZING AN ELDERLY OR DISABLED PERSON

(71) Applicant: Carl Palmer, St. George, UT (US)

(72) Inventor: Carl Palmer, St. George, UT (US)

( * ) Notice: Subject to any disclaimer, the term of this patent is extended or adjusted under 35 U.S.C. 154(b) by 0 days.

(21) Appl. No.: 14/137,155

(22) Filed: Dec. 20, 2013

(51) Int. Cl.
*B62M 1/00* (2010.01)
*A61G 5/14* (2006.01)
*A61G 7/10* (2006.01)

(52) U.S. Cl.
CPC ................ *A61G 5/14* (2013.01); *A61G 7/1076* (2013.01)

(58) Field of Classification Search
USPC ....... 280/47.34; 5/81.1, 86.1, 81 R, 81 B, 83, 5/86
See application file for complete search history.

(56) References Cited

U.S. PATENT DOCUMENTS 4,934,003 A * 6/1990 Hayakawa et al. ........ 5/81.1 RP
5,148,557 A * 9/1992 Fridman et al. .................. 5/86.1
6,308,981 B1 * 10/2001 Proehl ........................... 280/657

* cited by examiner

*Primary Examiner* — John Walters
*Assistant Examiner* — James Triggs
(74) *Attorney, Agent, or Firm* — Gurr & Brande, PLLC; Robert A. Gurr

(57) ABSTRACT

In one embodiment, a stabilizing device comprises a rotating base, a torso support, and leverage handles. In one embodiment, the rotating base comprises a plurality of radially outward extending legs with wheels or casters, to enable the stabilizing device to be easily rotated and moved. In another embodiment, the rotating base is a shaft with a rotating means, such as ball bearings. The height of the shaft may further be adjustable using known methods, such as a hydraulic cylinder or equivalent means.

14 Claims, 3 Drawing Sheets

APPARATUS FOR STABILIZING AN ELDERLY OR DISABLED PERSON

TECHNICAL FIELD

The present technology relates to devices and apparatuses to assist the elderly or disabled. More particularly, the present technology relates to assisting the elderly or disabled to rise up from, or lower down to, a seated or lying position.

BACKGROUND

One of the biggest concerns for the elderly and those with disabilities is the fear of falling. Even if they are able to get to their feet, the risk of losing their balance and falling is very high. This is especially true when trying to use a toilet, as the person must let go of any stabilizing device in order to lower their clothing. Many people have fallen by letting go of their stabilizers while lowering or removing clothing. Even simple transfers from bed to chair, or chair to bed can be difficult and highly risky tasks to the elderly or disabled individual. Because of this, many individuals are at the mercy of a caregiver to assist them. This means that the person must remain in the bed until the caregiver arrives to assist them. Even with the assistance of a caregiver, the task is still very difficult. The caregiver not only struggles to lift the person, but it may lead to injuries for both parties. Further, many individuals do not have caregivers and need other means for moving about. The present invention seeks to solve these and other problems.

SUMMARY OF EXAMPLE EMBODIMENTS

In one embodiment, a stabilizing device comprises a rotating base, a torso support, and leverage handles. In one embodiment, the rotating base comprises a plurality of radially outward extending legs with wheels or casters, to enable the stabilizing device to be easily rotated and moved.

In another embodiment, the rotating base is a shaft with a rotating means, such as ball bearings. The height of the shaft may further be adjustable using known methods, such as a hydraulic cylinder or equivalent means.

DETAILED DESCRIPTION OF EXAMPLE EMBODIMENTS

Figure 1:
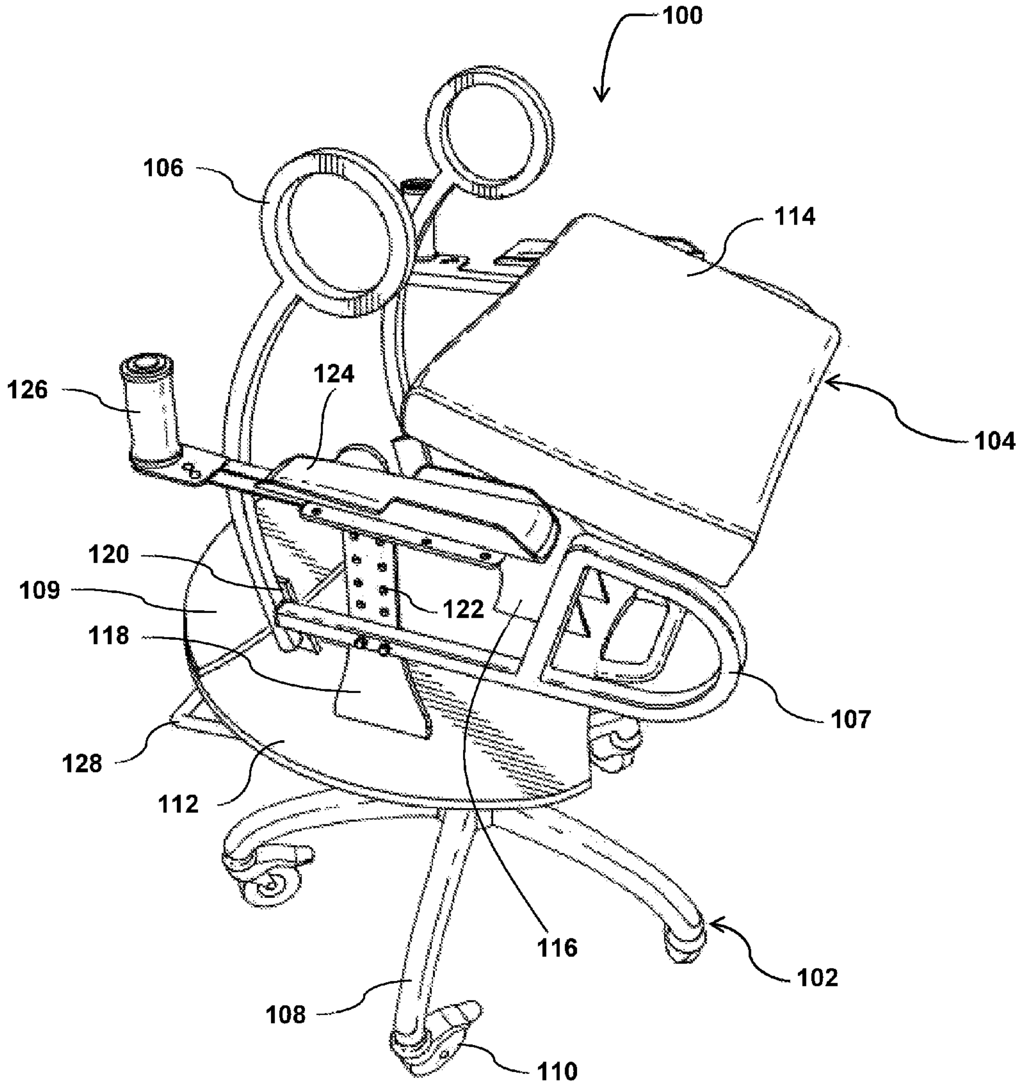
FIG. 1 is a perspective view of a stabilizing device with a wheel base

The following descriptions depict only example embodiments and are not to be considered limiting of its scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention. Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence or arrangement. Indeed, the steps of the disclosed processes or methods generally may be carried out in various different sequences and arrangements while still falling within the scope of the present invention.

In one embodiment, a stabilizing device 100 comprises a rotating base 102, a torso support 104, and upper leverage handles 106. In one embodiment, the rotating base 102 comprises a plurality of radially outward extending legs 108 with wheels or casters 110, to enable the stabilizing device 100 to be easily rotated and moved. Wheels or casters 110 may also be lockable. Torso support 104 comprises a base plate 112, a resting cushion 114 on supports 116, and mounting plates 118 for upper leverage handles 106 and lower leverage handles 107. Base plate 112 should be made from heavy materials, such as steel or other metals, so as to create a lower center of gravity, reducing the risk that stabilizing device 100 will tip. Although metals and their combinations are suggested, other means that accomplish the same result are contemplated herein. For example, the base plate 112 may be made from plastics and filled with materials (e.g., sand, cement) to give it a sufficient weight so as to assist in offsetting the average weight of an adult. Further, additional counter-weights 109 may be added to further stabilize the stabilizing device 100 when in use. Base plate 112 may also rest on ball bearings, allowing rotation of base plate 112. The resting cushion 114 may be made from foam pads or any other suitable material or combination that is known to those in the art. Supports 116 are likewise made from metals of sufficient strength to support the weight of an adult person. Ideally, supports 116 are permanently affixed (e.g., welded) to base plate 112. Cushion 114 may be removable attachable to supports 116, such as by using nuts and bolts or other means, or may permanently attached. The benefit of having cushion 114 removable is that it can be replaced if it gets worn out or more easily cleaned if it becomes dirty. It will be appreciated that cushion 114 has a metal backing or other suitable means for not only supporting the cushion 114 when laid on, but for allowing for appropriate attachment to supports 116. Further, torso support 104 may be adjustable for different angles, allowing a user maximum comfort.

Figure 2:
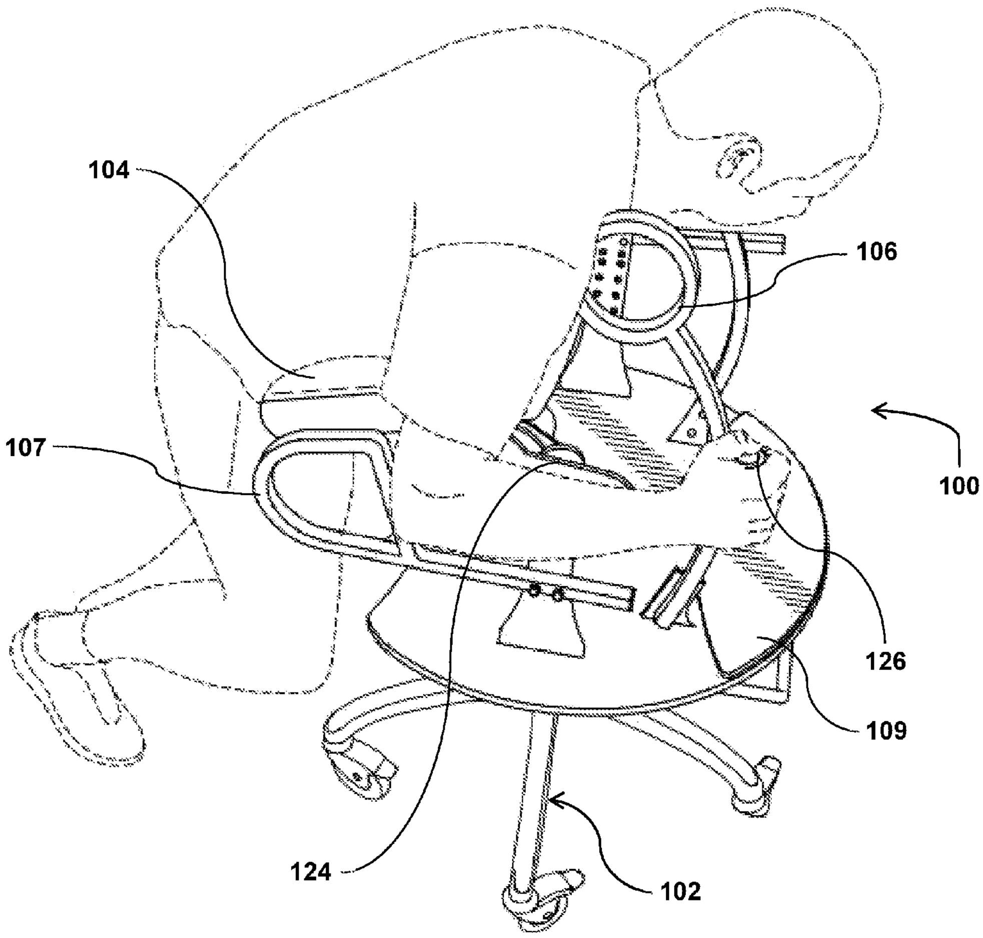
FIG. 2 a perspective view of a stabilizing device in use

Upper leverage handles 106 may be directly connected to base plate 112, may be connected to mounting plates 118, or may be connected to lower leverage handles 107. Upper leverage handles 106 and lower leverage handles 107 may be of a single manufacture, or may be two separate articles either removably connectable, such as using a bolt plate 120 (which is welded to base plate 112), or permanently affixed by welding or similar means. Further, if upper leverage handles 106 and lower leverage handles 107 are connected to each other, they may be adjustable in height using apertures 122 in mounting plate 118. If they are separate, as best seen in FIG. 2, upper leverage handles 106 are not adjustable, but remain fixed. It will be appreciated that although a mounting plate 118 is shown, it may be replaced with other similar achieving means, such as telescoping rods with locking positioners.

In one embodiment, stabilizing device 100 further comprises arm rests 124. Arm rests 124 may likewise be adjustable in the same manner as lower leverage handles 107. For ease of use and added stability, arm rests 124 may also have hand grips 126.

In another embodiment, stabilizing device 100 may comprise lever 128 to raise and lower the height of base plate 112, so as to accommodate a variety of different heights of people. For example, rotating base may be connected to base plate via a hydraulic telescoping shaft (cylinder and piston), similar to that used on an office or barber chair, that allows a user to raise and lower the stabilizing device 100 to an appropriate height for the user.

FIG. 2 shows an example of stabilizing device 100 in use. For example, when a user desires to rise up from a laying position, the user may grab leverage handles 107 to get to a sitting position if needed. As the user stands, pulling and supporting themselves using upper leverage handles 106, they rest their torso on torso support 104. The user may also grab hand grips 126 to be able to comfortably rest their torso on the torso support 104. Once the torso is fully rested, it takes the stress off of the user's knees and greatly reduces the risk of falling. A user may then rotate using rotatable base 102 to move around to the desired location. For example, a user desiring to use a toilet (or commode) could wheel to the toilet and/or rotate around to ready themselves. Because the weight of their torso is on the torso support 104, the user may freely let go of upper leverage handles 106 or hand grips 126 to lower or remove clothing without the risk of instability typically encountered by the elderly or injured. The user may freely use both hands to lower their clothing, and then use stabilizing device 100 to lift themselves back up from the toilet where they can again rest their torso on torso support 104. Resting again on torso support 104, a user may then re-dress themselves without worry of falling. Once completed, the user may wheel themselves to their desired location.

Figure 3:
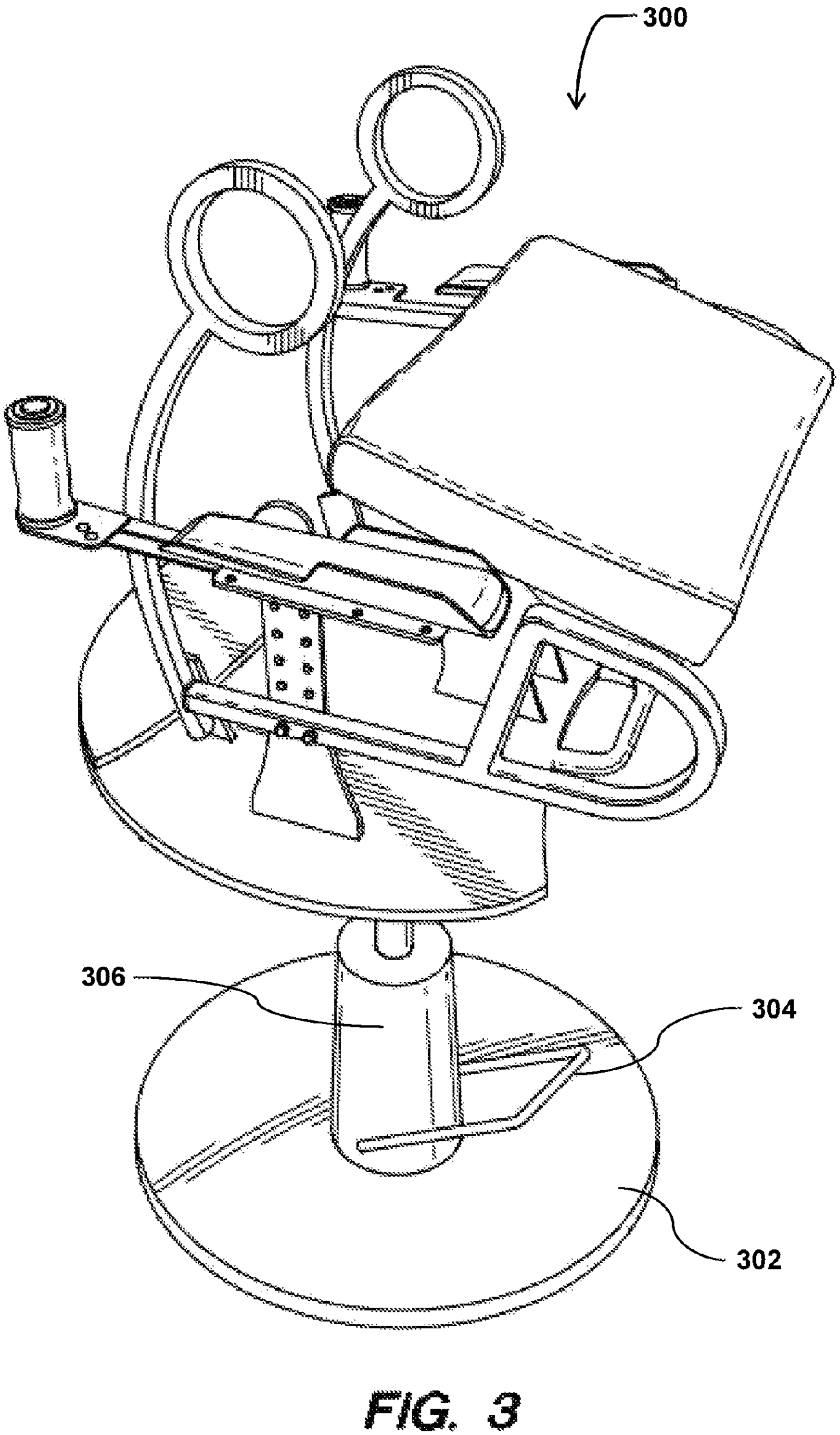
FIG. 3 is a perspective view of a stabilizing device with a semi-permanent floor base

In some instances, a moving base may not be desired. For example, as seen in FIG. 3, stabilizing device 300 comprises base 302. Base 302 is preferably still height adjustable, such as by using lever 304 and hydraulic cylinder system 306 or other means known to those with skill in the art, and is rotatable, such as by using ball bearings or other means known to those in the art. Stabilizing device 300 may also include any of the embodiments described in this disclosure.

What is claimed is:

1. A stabilizing device for the elderly or disabled, comprising:
- a rotating base;
- a torso support;
- a first set of leverage handles and a second set of leverage handles;
- a set of hand grips;
- a set of arm rests; and
- at least one counter weight.

2. The stabilizing device of claim 1, wherein the rotating base comprises a plurality of radially outward extending legs with wheels or casters.

3. The stabilizing device of claim 1, wherein the rotating base comprises ball bearings.

4. The stabilizing device of claim 1, wherein the torso support comprises a base plate, a resting cushion, resting supports, and mounting plates.

5. The stabilizing device of claim 1, wherein the height and angle of the torso support is adjustable.

6. The stabilizing device of claim 5, wherein the means to adjust the height of the torso support is a hydraulic cylinder mechanism.

7. The stabilizing device of claim 1, wherein the leverage handles include upper and lower leverage handles.

8. A stabilizing device for the elderly or disabled, comprising:
- a fixed, non-wheeled, base stand;
- a rotating torso support;
- a first set of leverage handles and a second set of leverage handles;
- a set of hand grips;
- a set of arm rests; and
- at least one counter weight.

9. The base stand of claim 8 comprising a hydraulic cylinder or telescopic pole.

10. The stabilizing device of claim 8, wherein the rotating torso support comprises ball bearings.

11. The stabilizing device of claim 8, wherein the leverage handles comprise an upper pair of leverage handles and a lower pair of leverage handles.

12. A method for the elderly or disabled to move without assistance from a third party using a stabilizing device, the method comprising:
- the elderly or disabled person gripping the lower leverage handles to attain a seated position;
- placing their elbows on the resting cushion while grasping a set of upper leverage handles;
- pulling their torso up onto the torso support using their own strength coupled with the leverage of their elbows on the resting cushion;
- resting their torso on the resting cushion of the torso support;
- resting their arms on a pair of armrests while gripping a set of hand grips; and
- rotating the stabilizing device to the desired dismount location.

13. The method of claim 12, wherein the elderly or disabled person may move the stabilizing device without assistance by use of wheels or casters.

14. The method of claim 12 further comprising the steps of adding additional counter-weights to the apparatus before using the apparatus to pull oneself up and onto the device.

* * * * *